United States Patent
Felbecker et al.

(10) Patent No.: US 7,529,288 B2
(45) Date of Patent: May 5, 2009

(54) CHANNEL QUALIFICATION FOR AN ADAPTIVE FREQUENCY HOPPING METHOD BY MEANS OF BIT OR PACKET ERROR RATE MEASUREMENT AND SIMULTANEOUS FIELD STRENGTH MEASUREMENT

(75) Inventors: Britta Felbecker, München (DE); Markus Hammes, Dinslaken (DE); Roland Hellfajer, Bochum (DE); Alexander Uwah, Mülheim (DE)

(73) Assignee: Infineon Technologies AG, Munich (DE)

( * ) Notice: Subject to any disclaimer, the term of this patent is extended or adjusted under 35 U.S.C. 154(b) by 739 days.

(21) Appl. No.: 10/832,685

(22) Filed: Apr. 27, 2004

(65) Prior Publication Data

US 2004/0258137 A1    Dec. 23, 2004

(30) Foreign Application Priority Data

May 6, 2003    (DE)    ................................. 103 20 176

(51) Int. Cl.
*H04B 1/00*    (2006.01)
(52) U.S. Cl. ...................................................... 375/133
(58) Field of Classification Search ................. 375/132, 375/133, 135, 136, 272, 278, 295, 296, 346
See application file for complete search history.

(56) References Cited

U.S. PATENT DOCUMENTS

| | | | |
|---|---|---|---|
| 5,225,902 A * | 7/1993 | McMullan, Jr. ............. 725/121 |
| 5,323,447 A | 6/1994 | Gillis et al. | |
| 5,991,282 A * | 11/1999 | Langlet et al. ............... 370/332 |
| 6,115,407 A | 9/2000 | Gendel et al. | |
| 6,529,746 B1 * | 3/2003 | Kotzin ...................... 455/562.1 |
| 6,873,601 B1 * | 3/2005 | Chow et al. .................. 370/254 |
| 7,024,162 B2 * | 4/2006 | Muthuswamy et al. ... 455/67.11 |
| 7,110,768 B1 * | 9/2006 | Bridges et al. ............... 455/446 |
| 2003/0126492 A1 * | 7/2003 | Cavin ............................. 714/4 |
| 2004/0223467 A1 * | 11/2004 | Hundal et al. ................ 370/328 |

FOREIGN PATENT DOCUMENTS

| | | |
|---|---|---|
| DE | 101 23 639 A1 | 11/2001 |
| EP | 0 892 507 A1 | 1/1999 |
| EP | 1 119 112 A2 | 7/2001 |

\* cited by examiner

*Primary Examiner*—Chieh M Fan
*Assistant Examiner*—Jaison Joseph
(74) *Attorney, Agent, or Firm*—Eschweiler & Associates, LLC

(57) ABSTRACT

In a method for qualification of a frequency channel in a wire-free communication system, data is transmitted on different frequency channels by means of an adaptive frequency hopping method. The transmission and reception are carried out in time slots using a time slot method which is based on the radio standard. In order to qualify the transmission quality of the frequency channels, data packet error rates and/or bit error rates and the field strength of the received data signal are measured, and the measured field strength is compared with a threshold value field strength in order to make a selection decision.

7 Claims, 1 Drawing Sheet

CHANNEL QUALIFICATION FOR AN ADAPTIVE FREQUENCY HOPPING METHOD BY MEANS OF BIT OR PACKET ERROR RATE MEASUREMENT AND SIMULTANEOUS FIELD STRENGTH MEASUREMENT

REFERENCE TO RELATED APPLICATIONS

This application claims the benefit of the priority date of German application DE 103 20 176.9, filed on May 6, 2003, the contents of which are herein incorporated by reference in their entirety.

FIELD OF THE INVENTION

The invention relates to a method for qualification of the transmission quality of the frequency channels in a radio system, in particular a wire-free communication system, which uses a frequency hopping method, and to a channel selection method which is based on thereon.

BACKGROUND OF THE INVENTION

In the case of radio systems, particularly in the case of wire-free communication systems, which allow frequency spreading by transmission of data on different frequency channels (for example frequency hopping in the case of Bluetooth), it is possible to mask out certain frequency channels in order in this way to avoid interference influences in the transmission. In the case of so-called adaptive frequency hopping methods (AFH), the frequency channels are masked out and matching to the frequency channel is carried out, automatically.

In general, a distinction is drawn between two approaches for such classification or qualification of a frequency channel, and one of these two approaches is chosen for masking out a frequency channel. In a first approach, the connection to be adapted (for example Bluetooth) is changed such that a further connection (for example WLAN=Wireless Local Area Network) is not interfered with. In the second approach, the procedure is for the connection to be adapted (for example Bluetooth) to be changed such that any possible interference from another connection has as little interference influence as possible. In this second approach, an assessment of the bit or data packet error rate on the channels is used, for example, for this purpose. In the first approach mentioned above, the field strength may be determined at times at which the connection to be adapted is not active, in order in this way to obtain information about the activity and the use of the frequency channels by another radio system.

In the second approach mentioned above it is possible, for example, to provide for the qualification of a radio channel for a bit or data packet error rate measurement always to be carried out during the reception of data or data packets. If the bit or data packet error rate measurement results in a value that is high in comparison to a comparison value, this frequency channel is subsequently inhibited or is masked out for data transmission on this frequency channel, as a result of which no more communication takes place on this frequency channel, since an interference source can be assumed, or the interference component on this frequency channel is too high.

One major disadvantage of this procedure is that it is impossible to decide with sufficient confidence the extent to which an interference source or an excessive interference component is actually present on that frequency channel. This is because it is also possible for a high bit or data packet error rate to be measured because the two communicating units in the radio system (for example two Bluetooth appliances) are a relatively long distance away from one another and, because of this fact, the received signal or data signal can no longer be sampled without errors. Thus, in this situation, an excessively high interference component would incorrectly be determined in that frequency channel, so that a frequency channel could possibly be inhibited even though no interference source or excessively high interference component is actually present. Since, in particular, this reason for an increased bit or data packet error rate is not frequency-selective, this would result in a large number of incorrect decisions being made with regard to masking out frequency channels in this situation, and would thus lead to a considerably increased number of frequencies and frequency channels which can no longer be used.

A method for channel selection and for digital data transmission via a wire-free communication link is known from German Laid-Open Specification DE 101 23 639 A1.

In this case, a number of channels are provided for data transmission, via which a first and a second transmitting/receiving unit communicate without the use of wires. The digital data communication via a wire-free communication link is provided by means of data packets which are transmitted sequentially via a number of frequency channels. The communication quality of each frequency channel is recorded and is compared with a quality criterion which can be predetermined. Channels with an inadequate communication quality are replaced by previously unused channels, and/or the amount of control data which is contained in each data packet is chosen as a function of the recorded overall quality of the communication link. In the case of those methods which are used in a cordless telephone system, only a general quality figure is determined for a frequency channel, and is compared with a quality criterion. The decision as to whether a frequency channel is thus used or masked out for a data transmission can thus be made only very unreliably and inadequately. Furthermore, in this known method, a selection of one or more frequency channels is made first of all, only after which is the choice made of the data packet type with which the corresponding data will be transmitted. The quality figure for a frequency channel thus includes no information about data packet structures and data packet characteristics. The determination of an interference component in a frequency channel or whether the frequency channel is identified and classified as an interfering source can thus be made only very inadequately when using these known methods.

SUMMARY OF THE INVENTION

One object of the invention is to provide a method for qualification of the transmission quality of frequency channels of a transmission method which uses a frequency hopping method, by means of which the decision confidence as to whether a frequency channel is or is not used for data transmission can be improved. A further object is to provide a channel selection method based on the qualification method.

In a method according to the invention for qualification of the transmission quality of frequency channels in a radio system which uses a frequency hopping method, in particular a wire-free communication system, with at least two units in the radio system communicating via the frequency channels, a data packet error rate and/or a bit error rate and the field strength of the received data signal are/is measured. The measured field strength is compared with a threshold value field strength. Since a field strength is measured in addition to an error rate or error rates, it is possible to determine and decide very accurately whether a frequency channel is used for the transmission of data, or is masked out.

An RSSI measurement (Radio Signal Strength Indicator value) which is known per se from the prior art is carried out in a preferred manner in order to determine the field strength of the received data signal. This results in field strength information being obtained in a simple, reliable and fast manner.

It is also advantageous for the measurement of the data packet error rate and/or of the bit error rate and of the field strength of the received data signal to be carried out at the same time. This allows a further improved assessment of the interference on a frequency channel to be guaranteed, and a more reliable selection decision to be made. The field strength is in this case measured at the same time as an error rate, so that it is possible to decide accurately whether the measured error rate characterizes the actual interference, or whether this measured error rate has occurred as a result of two units in the radio system being too far apart. This embodiment variant is particularly advantageous for measurement at different times since, in the latter case, any relative movement in the meantime between the units can corrupt the assessment and selection decision.

The data packet error rate and/or the bit error rate and the field strength of the received data signal are advantageously measured in one transmission time slot in a measuring unit. This makes it possible to ensure that no data transmission takes place to the measuring unit in the radio system from a further unit in the radio system at the time of the measurement and in the time interval of the measurement.

A further aspect of the invention relates to a method for selection of a frequency channel in a wire-free communication system, in which the qualification of a radio channel is carried out on the basis of the method according to the invention as explained above, or using an advantageous embodiment of it.

A determination is advantageously made as to whether the measured field strength of the received data signal is below a threshold value which can be predetermined. If the field strength is below this threshold value which can be predetermined, the decision as to whether a frequency channel is used for the transmission of data is made independently of the information relating to the data packet error rates and/or the bit error rates. It is possible to determine in a particularly advantageous manner whether a measured error rate has actually occurred or is merely a result of the fact that two communicating units in the radio system are far away from one another, resulting in a received signal which can no longer be sampled without errors. The decision confidence as to whether a radio channel is masked out or is used for communication can thus be considerably improved. Furthermore, the reason for the interference component or, in general, an interference component can be determined and classified reliably.

The invention furthermore relates to an adaptive frequency hopping method, in which a number of frequency channels are provided for the transmission of data and the selection of the frequency channels is made using a method according to the invention for selection of a frequency channel based on the above statements and possibly on advantageous extensions.

In the case of the frequency hopping method, the data is advantageously transmitted and received in time slots in a time pattern which is based on a radio standard. Bluetooth, DECT, etc. may in this case be mentioned, by way of example, as the radio standard. In principle, the method according to the invention may, however, also be applied to mobile radio standards such as GSM (Global System for Mobile Communications) or GSM/EDGE (Enhanced Data Rates for GSM Evolution).

DETAILED DESCRIPTION OF THE INVENTION

Figure 1:
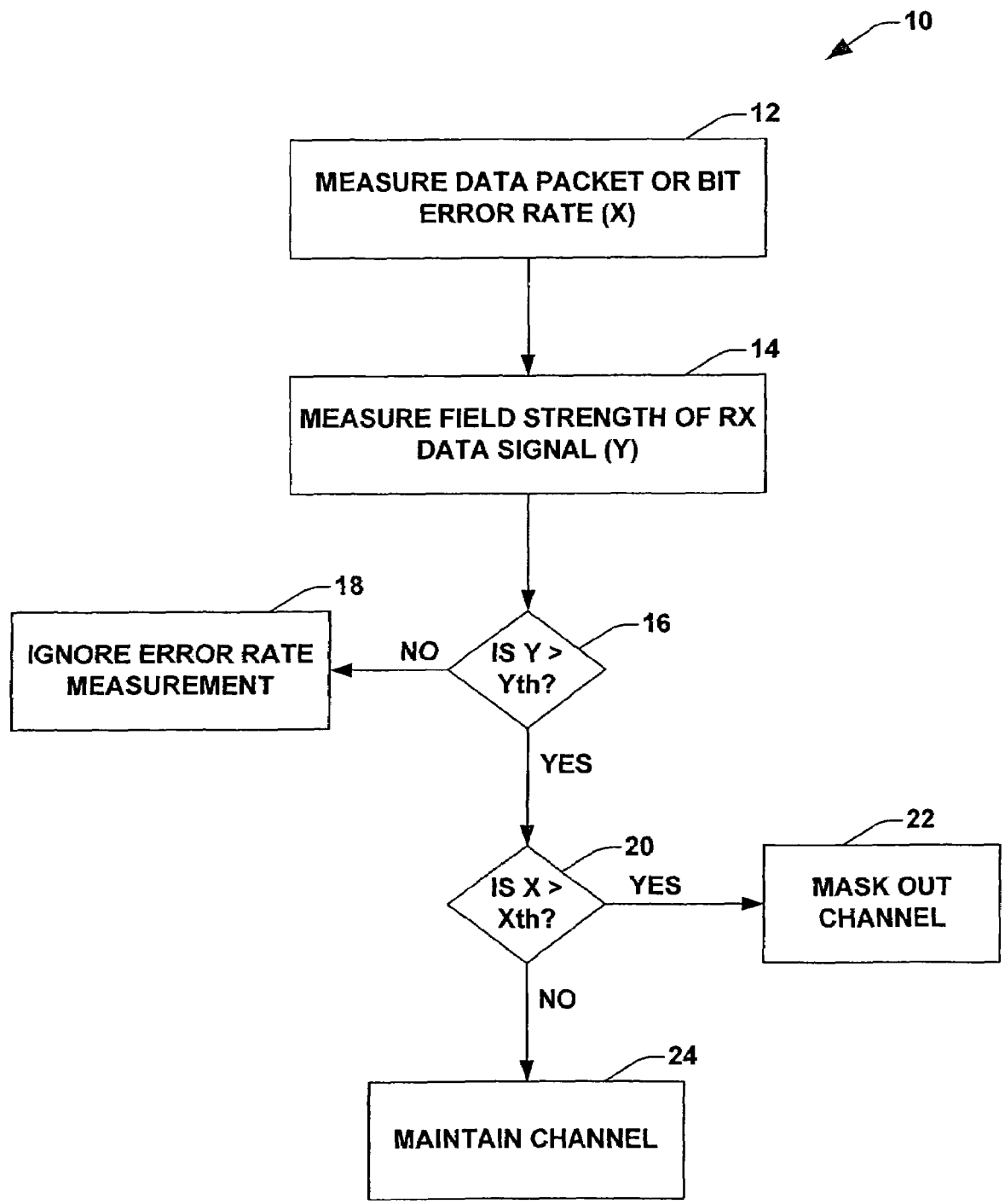
FIG. 1 is a flow chart diagram illustrating a method of performing adaptive frequency hopping in accordance with one aspect of the present invention.

One exemplary embodiment of the invention will be explained in more detail in the following text, in conjunction with the flow chart of FIG. 1. FIG. 1 illustrates an exemplary method 10 for qualifying the transmission quality of frequency channels for use in an adaptive frequency hopping methodology in accordance with one or more aspects of the invention. Although the method 10 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the devices and systems illustrated and described herein as well as in association with other structures not illustrated.

A wire-free communication system which is based on one or more of the radio standards mentioned above allows frequency spreading by transmission of data on different frequency channels. The communication system operates using an adaptive frequency hopping method, which also operates using time-division multiplexing. This means that the transmission and reception of data are based on a time slot method which allows transmission and reception only in time slots which are provided for this purpose. Data signals are transmitted and received between two or more units using one of many available frequency channels in an AFH methodology. When a data signal is received by a unit, then a data packet error rate and/or a bit error rate (X) associated with a received data packet is measured, as illustrated at 12 of FIG. 1. In addition, the field strength (Y) of the received data signal is measured at 14. The measurements at 12, 14 are carried out at the unit in a time interval in which the measuring unit is authorized to transmit, that is to say in a time interval in a transmission time slot. The measurement of the data packet error rates and/or bit error rates and, in addition, the field strength of the received signal allows unambiguous detection of interference sources in the communication system or on frequency channels whose interference component is too high.

If a high bit or data packet error rate results from the fact that units in a radio system, for example in a Bluetooth system, are a long distance away from one another, then the reception field strength at the unit in the radio system, or at the Bluetooth appliance, which is carrying out the bit and/or data packet error rate measurement will be too low in comparison to a threshold value. The field strength information is determined, for example, by measurement of the RSSI value at 16 of FIG. 1. Furthermore, this measurement of RSSI value and of the data packet error rate as well as the bit error rate is carried out virtually at the same time. If the field strength (Y) (e.g., the RSSI value) is below a defined threshold value (Yth)

that can be predetermined (NO at 16), this is an indication that the two transmitting/receiving units which are communicating in the radio system are located well away from one another. This additional field strength information can now be used to prevent a frequency channel from being masked out for the transmission of data even though it should actually be characterized as an interference source. That is, if the field strength Y is below the threshold Yth (NO at 16), then the error rate data collected at 12 is effectively ignored at 18.

If, however, the measured field strength exceeds the threshold (YES at 16), the method 10 performs another query at 20, wherein the measured error rate (X) (data packet error rate and/or bit error rate) is compared to another threshold (Xth). If it is now found in the exemplary embodiment that a high data packet error rate or a high bit error rate as well as a low RSSI value are measured at the same time (NO at 20), the data packet error rate or the bit error rate should not be used to make selection decisions on the frequency channel (ignoring action at 18). This means that, in this case, these error rates are not used, and they have no influence on the selection decision as to whether a frequency channel will be masked out or whether data transmission should take place via it. If, on the other hand, a high data packet error rate or a high bit error rate as well as a high RSSI value are measured at the same time (YES at 20), the frequency channel should be masked out at 22 of FIG. 1, and the error rates are in this case used as significant characteristic values in order to make the decision as to whether a frequency channel is or is not masked out.

Lastly, if the data packet or bit error rate (X) is less than the threshold (Xth) (NO at 20), then the evaluated frequency channel qualifies for further use and the frequency channel is maintained at 24 as an available channel for the AFH methodology going forward.

If an RSSI measurement has already been carried out during reception for power control of the mobile radio system, these RSSI values can also be used for the adaptive frequency hopping method. This means that there is no need to carry out any further additional measurements, and that all that is necessary is to evaluate the available data.

Structures which comprise 128 bits of speech data and 16 bits of control data may be used, for example, as data packet types. It is also possible to use structures which represent a control data packet comprising 80 bits and without any speech data. A control data packet such as this comprises 80 bits of data, of which 16 bits are provided for synchronization, 8 bits for the packet header part, 40 bits for the content and 16 bits for the CRC (Cyclic Redundancy Check).

In the method according to the invention for qualification of a frequency channel and for a selection decision as to whether a frequency channel is suitable for data transmission, a further characteristic variable, the field strength of the received data signal is thus also determined in addition to an error rate or error rates. If the measured reception field strength is below a defined threshold value which can be predetermined, the bit and data packet error rate measurements which are determined at the same time are rejected and are not taken into account for a decision as to whether the corresponding frequency channel is or is not identified as an interference source. The information which is significant to a selection decision is measured by a unit in the radio system at time intervals at which it can be guaranteed that no data has been transmitted from any other unit in the radio system to this measuring unit. It is thus advantageous for measurements such as these to be carried out in time slots which are intended for transmission by the measuring unit.

The invention claimed is:

1. A method for qualification of a transmission quality of frequency channels of a radio system which uses frequency hopping, comprising:
    communicating wirelessly between at least two units in the radio system via a frequency channel;
    measuring a data packet error rate or a bit error rate and a field strength of a received data signal;
    comparing the field strength with a threshold value field strength; and
    qualifying the transmission quality of the frequency channel based on the field strength comparison;
    selecting frequency channels for the wireless radio system based on the qualification of the transmission quality of the frequency channels,
    wherein the selection of a frequency channel is made independently of the information about the data packet error rate or the bit error rate, if the field strength of the received data signal is below the threshold value field strength.

2. A method of performing adaptive frequency hopping, comprising:
    concurrently evaluating a data packet error rate or a bit error rate and a field strength of a received data signal associated with a wireless communication on a frequency channel between two communication units, wherein the concurrent evaluation comprises:
        measuring the field strength of the received data signal; and
        comparing the measured field strength to a predetermined field strength threshold; and
    determining whether the frequency channel qualifies for subsequent use based on the concurrent evaluation, wherein determining whether the frequency channel qualifies for subsequent use further comprises:
        maintaining the frequency channel within a group of available frequency channels for adaptive frequency hopping if the measured field strength exceeds the predetermined threshold and the data packet error rate or bit error rate is less than a predetermined error rate threshold.

3. The method of claim 2, wherein the concurrent evaluation is performed within one single transmission time slot of a receiving one of the communication units.

4. A method of performing adaptive frequency hopping, comprising;
    concurrently evaluating a data packet error rate or a bit error rate and a field strength of a received data signal associated with a wireless communication on a frequency channel between two communication units, wherein the concurrent evaluation comprises:
        measuring the field strength of the received data signal; and
        comparing the measured field strength to a predetermined field strength threshold; and
    determining whether the frequency channel qualifies for subsequent use based on the concurrent evaluation, wherein determining whether the frequency channel qualifies for subsequent use further comprises:
        ignoring the data packet error rate or the bit error rate if the measured field strength is less than the predetermined field strength threshold; and
        maintaining the frequency channel within a group of available frequency channels for adaptive frequency hopping.

5. The method of claim 4, wherein the concurrent evaluation is performed within one single transmission time slot of a receiving one of the communication units.

6. A method of performing adaptive frequency hopping, comprising:

concurrently evaluating a data packet error rate or a bit error rate and a field strength of a received data signal associated with a wireless communication on a frequency channel between two communication units; and determining whether the frequency channel qualifies for subsequent use based on the concurrent evaluation, wherein the concurrent evaluation comprises maintaining the frequency channel as one of a plurality of available channels in an adaptive frequency hopping methodology if the field strength of the received data signal is less than a predetermined threshold independently of whether the data packet error rate or bit error rate exceeds or falls below a predetermined error rate threshold.

7. The method of claim 6, wherein the concurrent evaluation is performed within one single transmission time slot of a receiving one of the communication units.

* * * * *